US012810903B2

(12) United States Patent
Wu

(10) Patent No.: US 12,810,903 B2
(45) Date of Patent: Nov. 24, 2026

(54) VIDEO DATA AND AUDIO DATA SYNCHRONIZATION DEVICE AND VIDEO DATA AND AUDIO DATA SYNCHRONIZATION METHOD

(71) Applicant: SigmaStar Technology Ltd., Xiamen (CN)

(72) Inventor: Jianhua Wu, Shanghai (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 0 days.

(21) Appl. No.: 19/317,441

(22) Filed: Sep. 3, 2025

(65) Prior Publication Data

US 2026/0094622 A1 Apr. 2, 2026

(30) Foreign Application Priority Data

Sep. 27, 2024 (CN) ........................ 202411365020.9

(51) Int. Cl.
*G11B 27/10* (2006.01)

(52) U.S. Cl.
CPC .................................... *G11B 27/10* (2013.01)

(58) Field of Classification Search
CPC .... G11B 27/10; H04N 21/242; H04N 21/233; H04N 21/23418; H04N 21/2343; H04N 21/4302; H04N 21/4394; H04N 21/44008; H04N 21/4402; H04N 21/8547
See application file for complete search history.

(56) References Cited

U.S. PATENT DOCUMENTS

2015/0049248 A1 * 2/2015 Wang ...................... H04L 65/65 370/389

* cited by examiner

*Primary Examiner* — Girumsew Wendmagegn
(74) *Attorney, Agent, or Firm* — Edell, Shapiro & Finnan, LLC

(57) ABSTRACT

A device includes audio and video input circuits, a processor, an audio output circuit, and a video output circuit. The audio input circuit receives an audio input according to a first clock signal. The processor stores the audio input to a memory according to a write pointer, processes the video input received via the video input circuit to generate and store a video output to the memory, and processes the audio input to generate and store an audio output to the memory. The audio output circuit outputs sub-audio data in the audio output according to a read pointer and a second clock signal, and adjusts the second clock signal. The video output circuit reads frame data in the video output from the memory. The processor determines whether to control the video output circuit to stop outputting according to a timestamp difference between the frame data and the sub-audio data.

10 Claims, 5 Drawing Sheets

VIDEO DATA AND AUDIO DATA SYNCHRONIZATION DEVICE AND VIDEO DATA AND AUDIO DATA SYNCHRONIZATION METHOD

This application claims the benefit of China application Serial No. CN202411365020.9, filed on Sep. 27, 2024, the subject matter of which is incorporated herein by reference.

BACKGROUND OF THE INVENTION

Field of the Invention

The present application relates to a video data and audio data synchronization device, and more particularly to a video data and audio data synchronization device and a video data and audio data synchronization method suitable for multiple scenarios.

Description of the Related Art

In some related art, a video and audio processing device synchronizes corresponding data in video data or audio data to be input with another set of data by means of introducing a fixed delay time into corresponding data. However, signal processing performed on video data or audio data may change along with different application scenarios, and the signal processing may also introduce delays having different time lengths for the video data or for the audio data. Thus, the fixed delay time above may be inapplicable to requirements for different application scenarios.

SUMMARY OF THE INVENTION

In some embodiments, it is an object of the present application to provide a video data and audio data synchronization device and a video data and audio data synchronization method suitable for multiple scenarios so as to improve the drawbacks of the prior art.

In some embodiments, a video data and audio data synchronization device includes an audio input circuit, a video input circuit, a processor, an audio output circuit, and a video output circuit. The audio input circuit receives audio input data from an input interface according to a first clock signal. The video input circuit receives video input data from the input interface. The processor is configured to control the operations of: storing the audio input data to a storage space in a memory according to a write pointer, performing video processing according to the video input data to generate video output data and storing the video output data to the memory, and performing audio processing according to the audio input data to generate audio output data and storing the audio output data to the storage space of the memory. The audio output circuit reads a plurality of sets of sub-audio data in the audio output data from the storage space according to a read pointer and a second clock signal, and adjusts the second clock signal according to the write pointer, the read pointer and the first clock signal. The video output circuit sequentially reads a plurality of sets of frame data in the video output data from the memory. The processor further determines, according to a first difference between a video timestamp corresponding to current frame data in the plurality of sets of frame data and an audio timestamp corresponding to current sub-audio data in the plurality of sets of sub-audio data, whether to control the video output data to stop outputting the current frame data.

In some embodiments, a video data and audio data synchronization method performed by a video data and audio data synchronization device includes the operations of: receiving video input data from an input interface, and receiving audio input data from the input interface according to a first clock signal; storing the audio input data to a storage space in a memory according to a write pointer, and performing video processing according to the video input data to generate video output data and storing the video output data to the memory; performing audio processing according to the audio input data to generate audio output data and storing the audio output data to the storage space of the memory; reading a plurality of sets of sub-audio data in the audio output data from the storage space according to a read pointer and a second clock signal, and adjusting the second clock signal according to the write pointer, the read pointer and the first clock signal; sequentially reading a plurality of sets of frame data in the video output data from the memory; and determining, according to a first difference between a video timestamp corresponding to current frame data in the plurality of sets of frame data and an audio timestamp corresponding to current sub-audio data in the plurality of sets of sub-audio data, whether to stop outputting the current frame data.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

All terms used in the literature have commonly recognized meanings. Definitions of the terms in commonly used dictionaries and examples discussed in the disclosure of the present application are merely exemplary, and are not to be construed as limitations to the scope or the meanings of the present application. Similarly, the present application is not limited to the embodiments enumerated in the description of the application.

The term "coupled" or "connected" used in the literature refers to two or multiple elements being directly and physically or electrically in contact with each other, or indirectly and physically or electrically in contact with each other, and may also refer to two or more elements operating or acting with each other. As given in the literature, the term "circuit" may be a device connected by at least one transistor and/or at least one active element by a predetermined means so as to process signals.

Figure 1:
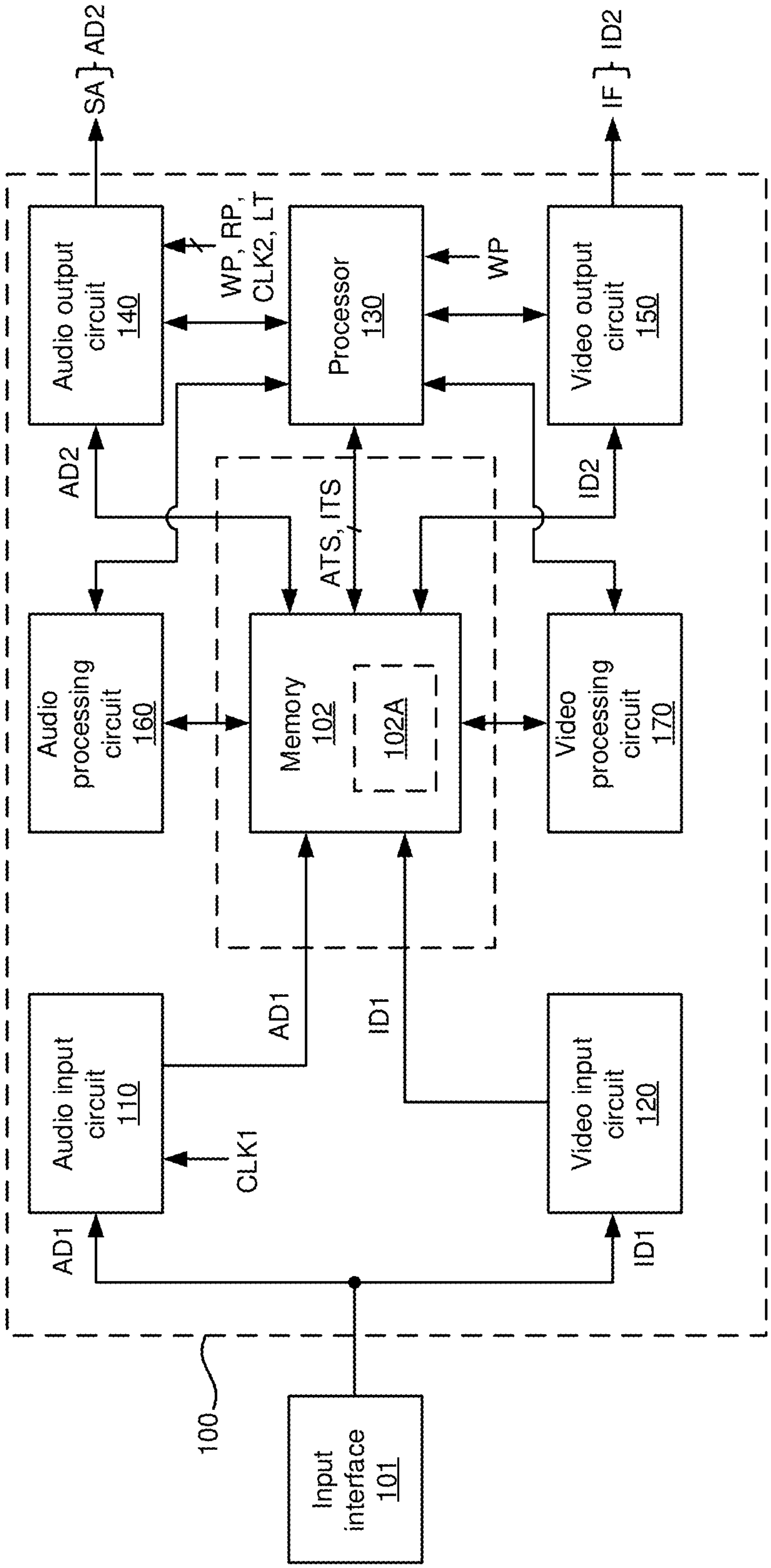
FIG. 1 is a schematic diagram of a video data and audio data synchronization device according to some embodiments of the present application.

FIG. 1 shows a schematic diagram of a video data and audio data synchronization device 100 according to some embodiments of the present application. The video data and audio data synchronization device 100 includes an audio input circuit 110, a video input circuit 120, a processor 130, an audio output circuit 140, a video output circuit 150, an audio processing circuit 160 and a video processing circuit 170. The audio input circuit 110 and the video input circuit 120 are coupled to an input interface 101, so as to receive audio input data AD1 and video input data ID1, respectively. In some embodiments, the input interface 101 may be, for example but not limited to, a High Definition Multimedia Interface (HDMI), which may provide mixed audio signals and video signals. The audio input circuit 110 and the video input circuit 120 may receive the signals above from the input interface 101, separate these signals into the audio input data AD1 and the video input data ID1, and store the data to the memory 102.

The processor 130 may configure multiple audio timestamps ATS for the audio input data according to related information of the audio input data AD1 and timestamps corresponding to clock signals received by the processor 130, and store the audio input data AD1 and the audio timestamps ATS to the memory 102. In some embodiments, the memory 102 may be, for example but not limited to, a dynamic random access memory (DRAM). For example, the processor 130 may obtain information such as the sampling rate, the data width, the number of data sets of each frame related to the audio input data AD1, and configure the multiple audio timestamps ATS of the audio input data AD1 according to the information above and the timestamps corresponding to the processor 130 itself.

Similarly, the processor 130 may receive the video input data ID1 from the video input circuit 120, and configure multiple video timestamps ITS of the video input data ID1 according to related information of the video input data ID1 and the timestamps corresponding to the processor 130 itself. For example, the processor 130 may obtain information such as frame timings related to the video input data ID1 from the video input circuit 120, and configure the multiple video timestamps ITS of the video input data ID1 according to the information above and the timestamps corresponding to the processor 130 itself. The processor 130 may store the video input data ID1 and the multiple video timestamps ITS to the memory 102.

In some embodiments, the processor 130 may perform video processing on the video input data ID1 stored in the memory 102 to generate video output data ID2. In some embodiments, the processor 130 may execute corresponding video processing software or activate the video processing circuit 170 to perform the video processing according to the video input data ID1. In some embodiments, the video processing may include, for example but not limited to, resolution conversion, format conversion, scaling, cropping and rotation. Similarly, in some embodiments, the processor 130 may perform audio processing on the audio input data AD1 stored in the memory 102 to generate audio output data AD2. In some embodiments, the processor 130 may execute corresponding audio processing software or activate the audio processing circuit 160 to perform the audio processing according to the audio input data AD1. In some embodiments, the audio processing may include, for example but not limited to, noise reduction, dynamic range compression and equalization.

In some embodiments, the processor 130 may write the audio input data AD1 to a storage space 102A of the memory 102 and store the audio output data AD2 to the storage space 102A according to a write pointer WP. In some embodiments, the storage space 102A may be implemented as a first-in-first-out (FIFO) buffer; however, the present application is not limited to the example above.

The audio input circuit 110 may receive the audio input data AD1 from the input interface 101 according to a clock signal CLK1. For example, the audio input circuit 110 includes a phase-locked loop (PLL) circuit (not shown), which is able to generate the clock signal CLK1 having a fixed frequency. The audio output circuit 140 sequentially reads a plurality of sets of sub-audio data SA in the audio output data AD2 from the storage space 102A according to a read pointer RP and a clock signal CLK2, and adjusts the clock signal CLK2 according to the write pointer WP, the read pointer RP and the clock signal CLK1. For example, the audio output circuit 140 includes a phase-locked loop (PLL) circuit (not shown), which is able to generate the clock signal CLK2 with a tunable frequency, wherein the frequency of the clock signal CLK2 may be adjusted according to the control of the audio output circuit 140. Thus, it is ensured that the storage space 102A is able to store a sufficient amount of audio data to be played during the process of audio output, so that the process of audio output does not suffer from any interruption or loss and a user does not sense any intermittent sounds. Related operation details of the above are to be described with reference to FIG. 2 below. In some embodiments, the audio output circuit 140 may be implemented by one or more digital circuits, a register circuit and the PLL circuit above; however, the present application is not limited to the examples above.

In some embodiments, related information of the write pointer WP and the read pointer RP may also be stored in the storage space 102A, or be stored in other predetermined spaces in the memory 102. Similarly, in some embodiments, related information of the multiple video timestamps ITS and the multiple audio timestamps ATS may also be stored in the memory 102, for the use of the processor 130, the audio output circuit 140, the video output circuit 150 and/or other circuits (for example but not limited to, the audio processing circuit 160 and the video processing circuit 170).

The video output circuit 150 may sequentially read the video output data ID2 from the memory 102, and sequentially read multiple sets of frame data in the video output data ID2. On the other hand, the processor 130 may further perform a predetermined operation to synchronize multiple sets of frame data IF of the video output data ID2 output from the video output circuit 150 with the multiple sets of sub-audio data SA of the audio output data AD2 output from the audio output circuit 140. More specifically, in some embodiments, the processor 130 may determine, according to a first difference between a video timestamp (for example, a corresponding one of the multiple video timestamps ITS above) corresponding to current frame data in the plurality of sets of frame data IF and an audio timestamp (for example, a corresponding one of the multiple audio timestamps ATS above) corresponding to current sub-audio data in the multiple sets of sub-audio data SA, whether to control the video output circuit 150 to stop outputting the current frame data. Thus, the processor 130 may dynamically and in real time adjust the timings and an adjustment amount of the frame data output from the video output circuit 150, allowing a user to experience playback effects of synchronized video and audio. Related operation details are to be described with reference to FIG. 3A below. In some embodiments, the video output circuit 150 may be implemented by one or more digital circuits, a register circuit or a video processing module; however, the present application is not limited to the examples above.

Figure 2:
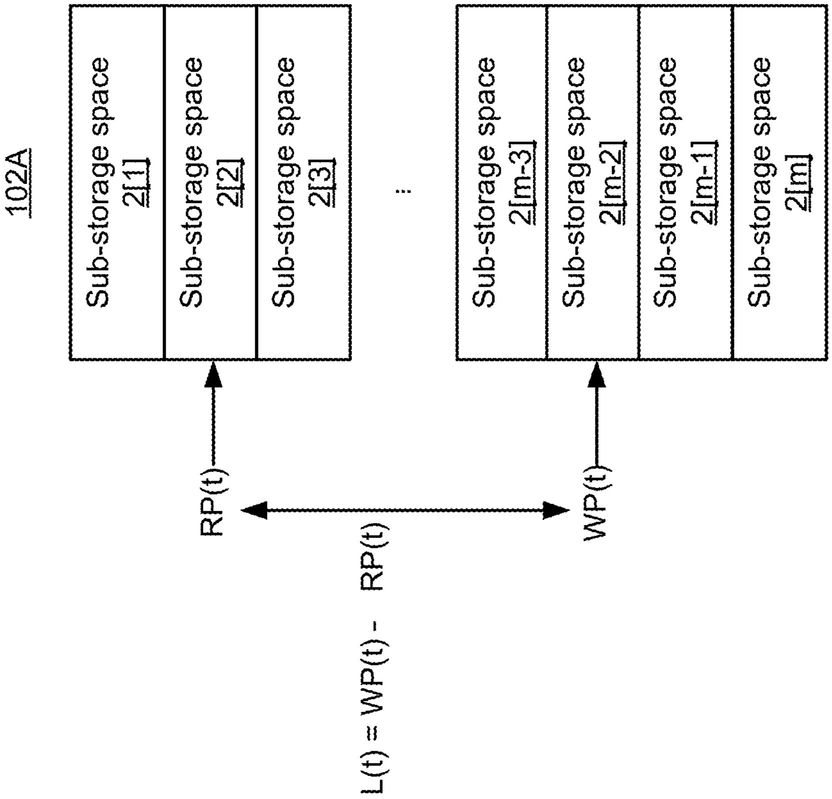
FIG. 2 is a schematic diagram of the storage space in FIG. 1 according to some embodiments of the present application.

FIG. 2 shows a schematic diagram of the storage space 102A in FIG. 1 according to some embodiments of the present application. As described above, in some embodiments, the storage space 102A may be implemented as a FIFO buffer. As shown in FIG. 2, the storage space 102A may be divided into multiple sub-storage spaces 2[1] to 2[*m*]. The write pointer WP at a timing t may be represented as WP(t), and the read pointer RP at the timing t may be represented as RP(t). The read pointer RP(t) may be used to instruct the audio output circuit 140 to read corresponding sub-audio data from a corresponding sub-storage space (for example, the sub-storage space 2[2]) at the timing t, and the write pointer WP(t) may be used to instruct the processor 130 to write a corresponding portion of data of the audio input data AD1 to another corresponding sub-storage space (for example, the sub-storage space 2[*m*−2]) at the timing t. To ensure that the audio data in the storage space 102A does not become fully read out, the audio output circuit 140 may determine a bias value bias(t) corresponding to a current timing (for example, the timing t) according to a difference L(t) and the target value LT in FIG. 1, and adjust the frequency of the clock signal CLK2 according to the bias value bias(t) and the frequency of the clock signal CLK1, wherein the difference L(t) is a difference between the write pointer WP(t) and the read pointer RP(t) corresponding to the current timing. In other words, the difference L(t) may be represented as: L(t)=WP(t)−RP(t), and the bias value bias(t) may be represented as: bias(t)=L(t)−LT.

Further, the audio output circuit 140 may determine a bias value i_bias(t) and a bias value d_bias(t) corresponding to the current timing according to the bias value bias(t), and determine the frequency of the clock signal CLK2 at the current timing according to a sum of the bias value i_bias(t), the bias value d_bias(t) and the frequency of the clock signal CLK1. In some embodiments, the bias value i_bias(t) corresponding to the current timing is a sum of the bias value bias(t) corresponding to the current timing and a bias value i_bias(t−1) corresponding to a previous timing (for example, (a timing t−1), and may be represented as: i_bias(t)=bias(t)+i_bias(t−1). On the other hand, the bias value d_bias(t) corresponding to the current timing is a difference between the bias value bias(t) corresponding to the current timing and a bias value bias(t−1) corresponding to the previous timing, and may be represented as: d_bias(t)=bias(t)-bias(t−1). In some embodiments, the audio output circuit 140 may determine the frequency of the clock signal CLK2 at a next timing according to the equation below:

$$AOP(t+1)=a\times \mathrm{bias}(T)+b\times \mathrm{i\_bias}(t)+c\times d)\mathrm{bias}(t)+AIP$$

In the equation above, AOP(t+1) is the frequency of the clock signal CLK2 at the next timing (that is, the timing t+1), AIP is the frequency of the clock signal CLK1, and the coefficients a, b and c are respectively weighting coefficients corresponding to the bias values and may be configured by circuit simulation in advance and/or by a real-time parameter adaptive adjustment mechanism. Once the frequency of the clock signal CLK2 at the next timing has been determined, the audio output circuit 140 may issue a corresponding control signal to a PLL circuit therein to adjust the frequency of the clock signal CLK2.

With the mechanism above, the operating frequency (for example, the frequency of the clock signal CLK2) of the audio output circuit 140 may be dynamically adjusted, thereby ensuring that the storage space 102A is able to store sufficient audio data to be output (that is, to be played) and further preventing interruption of the audio played. Thus, a user can be provided with enhanced acoustic experiences.

Figure 3A:
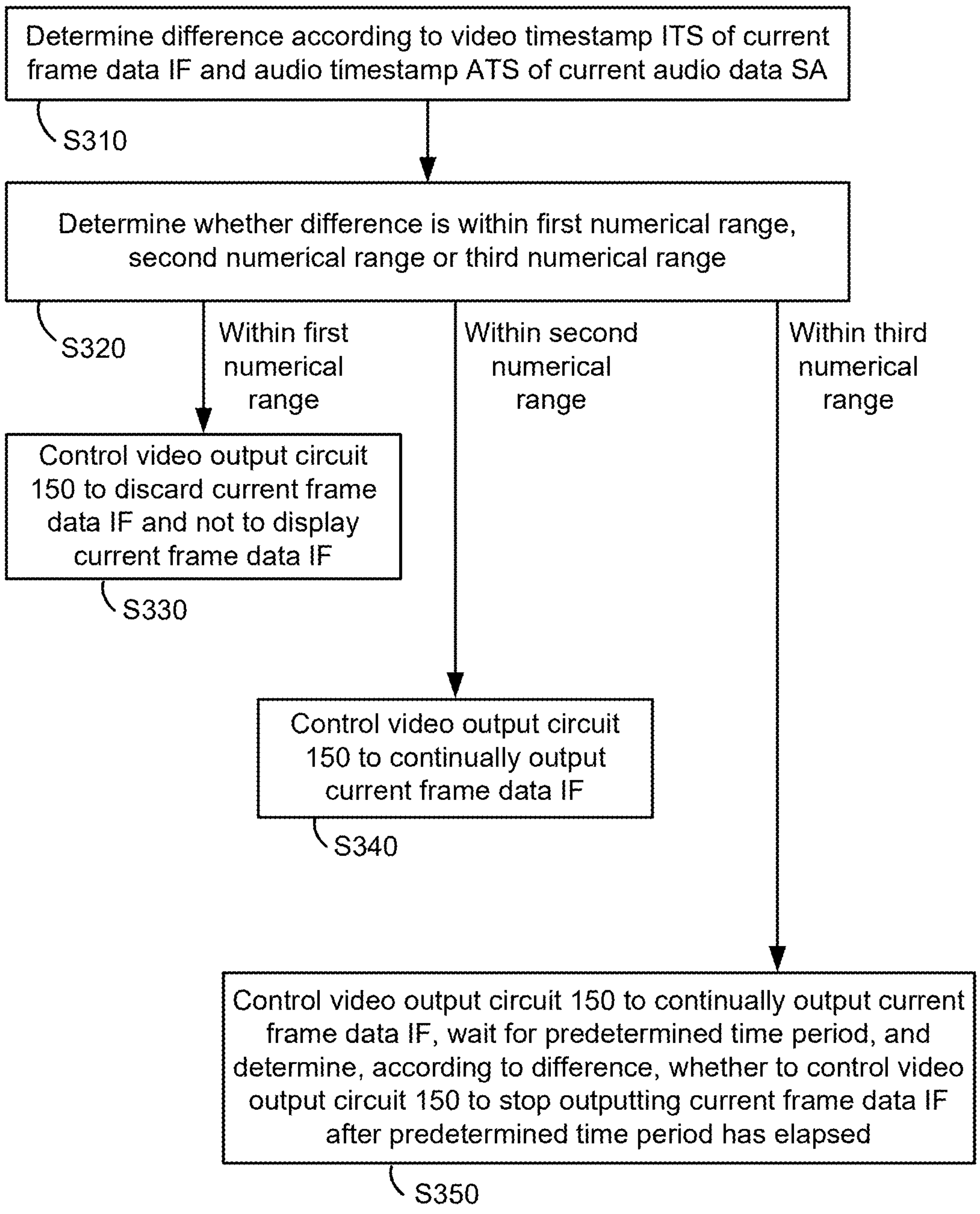
FIG. 3A is a flowchart of video data and audio data synchronization operations performed by the processor in FIG. 1 according to some embodiments of the present application.

FIG. 3A shows a flowchart of related video data and audio data synchronization operations performed by the processor 130 in FIG. 1 according to some embodiments of the present application. In operation S310, a difference is determined according to the video timestamp ITS of the current frame data IF and the audio timestamp ATS of the current sub-audio data SA. For example, operation S310 may be represented as: EUS=ITS−ATS, where EUS is the difference in operation S310. In operation S320, it is determined whether the difference is within a first numerical range, a second numerical range or a third numerical range. In operation S330, if the difference is within the first numerical range, the video output circuit 150 is controlled to discard the current frame data IF and not to output the current frame data IF. In operation S340, if the difference is within the second numerical range, the video output circuit 150 is controlled to continually output the current frame data IF. In operation S350, if the difference is within the third numerical range, the video output circuit 150 is controlled to continually output and display the current frame data IF, waits for a predetermined time period, and again determines, after the predetermined time period has elapsed, whether to control the video output circuit 150 to stop outputting the current frame data IF.

Figure 3B:
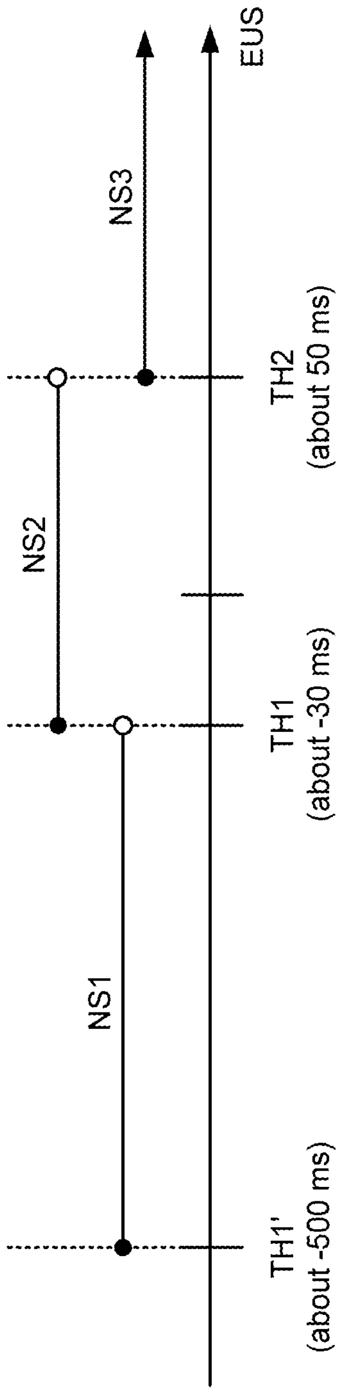
FIG. 3B is a schematic diagram of the first numerical range, the second numerical range and the third numerical range mentioned in FIG. 3A according to some embodiments of the present application.

Operation S330, operation S340 and operation S350 are described with reference to FIG. 3B below. FIG. 3B shows a schematic diagram of the first numerical range, the second numerical range and the third numerical range mentioned in FIG. 3A according to some embodiments of the present application.

Since the difference EUS represents the difference between the timing of the current frame data IF and the timing of the current sub-audio data SA, it means that the current frame data IF is ahead of the current sub-audio data SA if the difference EUS is a positive number. Conversely, it means that the current frame data IF is behind the current sub-audio data SA if the difference is a negative number. As shown in FIG. 3B, the first numerical range NS1 may be defined by a threshold TH1, wherein the threshold TH1 may be a negative number, and may be set to, for example, about −30 ms. Thus, if the difference EUS is a negative value and is less than the threshold TH1, it means that the difference EUS is within the first numerical range NS1. In this case, it means that the current frame data IF is very much behind the current sub-audio data SA, and thus the processor 130 may control the video output circuit 150 to discard the current frame data IF (that is, operation S330) to abandon display of the current frame data IF, hence accelerating display of the next frame data IF. In other words, if the current frame data IF is very much behind the current sub-audio data SA, the processor 130 may accordingly abandon display of a portion of the current frame data IF so as to reduce the delay in video display. In some other embodiments, the first numerical range NS1 may be defined by the threshold TH1 and a threshold TH1', wherein the threshold TH1' is a negative number less than the threshold TH1, for example, the threshold TH1' may be configured to be about −500 ms. In this case, if the difference EUS is more than or equal to the threshold TH1' and less than the threshold TH1, it means that the difference EUS is within the first numerical range NS1.

The second numerical range NS2 may be defined by the threshold TH1 and a threshold TH2, wherein the threshold TH2 may be a positive number, and may be set to, for example, about 50 ms. Thus, if the difference EUS is greater than or equal to the threshold TH1 and less than the threshold TH2, it means that the difference EUS is within the second numerical range NS2. In this case, it means that the current frame data IF is close to (that is, substantially synchronous with) the current sub-audio data SA, and thus the processor 130 may control the video output circuit 150 to continually output the current frame data IF (that is, operation S340).

The third numerical range NS3 may be defined by the threshold TH2. Thus, it means that the difference EUS is within the third numerical range NS3 if the difference EUS is greater than or equal to the threshold TH2. In this case, it means that the current frame data IF is very much ahead of the current sub-audio data SA, and thus the processor 130 may control the video output circuit 150 to continually output and display the current frame data IF, and waits for a predetermined time period (for example but not limited to, 10 ms) (that is, operation S350). As such, the display time for the current frame data IF may be delayed. After the predetermined time period has elapsed, the processor 130 may again determined according to the difference EUS whether to control the video output circuit 150 to stop outputting the current frame data IF (that is, operation S310 is again performed after the predetermined time period has elapsed). In other words, because human ears are far more sensitive than human eyes, if the timing of the current frame data IF is too much ahead of the timing of the current sub-audio data SA, the processor 130 may continually display the current frame data IF currently being displayed, and wait for the predetermined time period as described above. After the predetermined time period has elapsed, the processor 130 may again perform the same operations to determine whether to adjust the video output circuit 150 to stop displaying the current frame data IF, so as to determine whether to adjust video and audio synchronization at the next timing.

With the synchronization mechanism above, the processor 130 is able to dynamically adjust, according to the video timestamp ITS corresponding to the current frame data IF and the audio timestamp ATS corresponding to the current sub-audio data SA, the timing at which the video output circuit 150 outputs the corresponding frame data IF, thereby synchronizing the timing at which the video frame data is displayed and the timing at which the sub-audio data is played. Thus, the processor 130 is able to synchronize the video output data ID2 having undergone different types of video processing and the audio output data AD2 having undergone different types of audio processing, thereby providing a user with better experiences.

In some related art, a video and audio processing device adjusts one of video data and audio data by setting a fixed delay time, so that the adjusted video data or audio data can be synchronized with the other of the video data and the audio data. However, for different application scenarios of such video and audio processing device, the video processing or audio processing correspondingly performed may be different, in a way that the fixed delay time may fail to correctly synchronize the two types of data above. In this case, the video and audio processing device set up in such scenario needs to be re-tested in order to identify an appropriate delay time. Compared to the prior art above, in some embodiments of the present application, the processor 130 dynamically adjusts the display time of the frame data according to respective timestamps of video data and audio data. Thus, video data and audio data synchronization can be achieved in real time in different scenarios.

Figure 4:
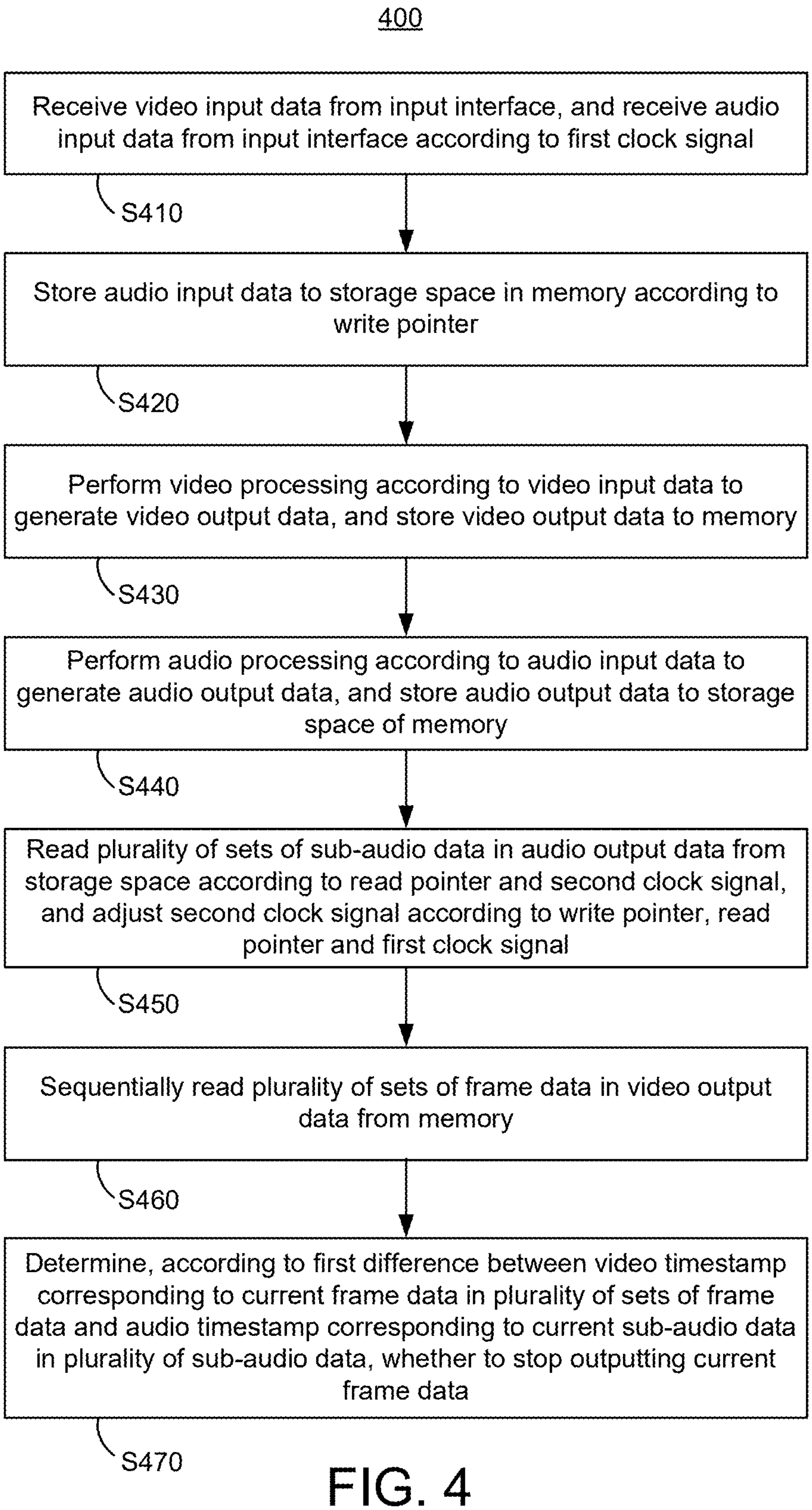
FIG. 4 is a flowchart of a video data and audio data synchronization method according to some embodiments of the present application.

FIG. 4 shows a flowchart of a video data and audio data synchronization method 400 according to some embodiments of the present application. In some embodiments, the video data and audio data synchronization method 400 may be performed by, for example but not limited to, the video data and audio data synchronization device 100 in FIG. 1.

In operation S410, video input data is received from an input interface, and audio input data is received from the input interface according to a first clock signal. In operation S420, the audio input data is stored to a storage space in a memory according to a write pointer. In operation S430, video processing is performed according to the video input data to generate video output data, and the video output data is stored to the memory. In operation S440, audio processing is performed according to the audio input data to generate audio output data, and the audio output data is stored to the storage space of the memory. In operation S450, multiple sets of sub-audio data in the audio output data are read from the storage space according to a read pointer and a second clock signal, and the second clock signal is adjusted according to the write pointer, the read pointer and the first clock signal. In operation S460, multiple sets of frame data in the video output data are sequentially read from the memory. In operation S470, it is determined, according to a first difference between a video timestamp corresponding to current frame data in the plurality of sets of frame data and an audio timestamp corresponding to current sub-audio data in the plurality of sets of sub-audio data, whether to stop outputting the current frame data.

Details associated with the multiple operations of the video data and audio data synchronization method 400 above can be referred from the details of the multiple embodiments above, and such repeated details are omitted herein. The multiple operations above are merely examples, and are not limited to being performed in the order specified in this example. Without departing from the operation means and ranges of the various embodiments of the present application, additions, replacements, substitutions or omissions may be made to the operations of the video data and audio data synchronization method 400, or the operations may be performed in different orders. Alternatively, all or some of one or more the operations in the video data and audio data synchronization method 400 may be performed simultaneously.

In conclusion, the video data and audio data synchronization device and the video data and audio data synchronization method provided according to some embodiments of the present application are able to adjust the operating frequency of an audio output circuit according to the actual amount of data accessed during the process of outputting audio data, and are able to dynamically adjust the display timing of frame data according to the timestamp of the current frame and the timestamp of the current audio, thereby substantially synchronizing video data and audio data during a playback process in various scenarios and hence providing a user with enhanced experiences.

While the present application has been described by way of example and in terms of the preferred embodiments, it is to be understood that the disclosure is not limited thereto. Various modifications may be made to the technical features of the present application by a person skilled in the art on the basis of the explicit or implicit disclosures of the present application. The scope of the appended claims of the present application therefore should be accorded with the broadest interpretation so as to encompass all such modifications.

What is claimed is:

1. A video data and audio data synchronization device, comprising:
- an audio input circuit, receiving audio input data from an input interface according to a first clock signal;
- a video input circuit, receiving video input data from the input interface;
- a processor, configured to perform operations of:
  - storing the audio input data to a storage space in a memory according to a write pointer;
  - performing video processing according to the video input data to generate video output data, and storing the video output data to the memory; and
  - performing audio processing according to the audio input data to generate audio output data, and storing the audio output data to the storage space of the memory;
- an audio output circuit, reading a plurality of sets of sub-audio data in the audio output data from the storage space according to a read pointer and a second clock signal, and adjusting the second clock signal according to the write pointer, the read pointer and the first clock signal; and
- a video output circuit, sequentially reading a plurality of sets of frame data in the video output data from the memory,
- wherein the processor further determines, according to a first difference between a video timestamp corresponding to current frame data in the plurality of sets of frame data and an audio timestamp corresponding to current sub-audio data in the plurality of sets of sub-audio data, whether to control the video output circuit to stop outputting the current frame data.

2. The video data and audio data synchronization device according to claim 1, wherein the audio output circuit determines a first bias value corresponding to a current timing according to a difference between a second difference and a target value, and adjusts a frequency of the second clock signal according to the first bias value and a frequency of the first clock signal, wherein the second difference is a difference between the write pointer and the read pointer corresponding to the current timing.

3. The video data and audio data synchronization device according to claim 2, wherein the audio output circuit determines a second bias value and a third bias value corresponding to the current timing according to the first bias value, and determines the frequency of the second clock signal at a next timing according to a sum of the first bias value, the second bias value, the third bias value corresponding to the current time and a frequency of the first clock signal.

4. The video data and audio data synchronization device according to claim 3, wherein the second bias value corresponding to the current timing is a sum of the first bias value corresponding to the current timing and the second bias value corresponding to a previous timing, and the third bias value corresponding to the current timing is a difference between the first bias value corresponding to the current timing and the first bias value corresponding to the previous timing.

5. The video data and audio data synchronization device according to claim 1, wherein when the first difference is a negative number and is less than a threshold, the processor controls the video output circuit to discard the current frame data and not to output the current frame data.

6. The video data and audio data synchronization device according to claim 1, wherein when the first difference is greater than or equal to a first threshold and less than a second threshold, the processor controls the video output circuit to continually output the current frame data.

7. The video data and audio data synchronization device according to claim 6, wherein the first threshold is a negative number and the second threshold is a positive number.

8. The video data and audio data synchronization device according to claim 1, wherein when the first difference is a positive number and is greater than or equal to a threshold, the processor controls the video output circuit to continually output and display the current frame data, waits for a predetermined time period, and again determines, according to the first difference, whether to control the video output circuit to stop outputting the current frame data after the predetermined time period has elapsed.

9. A video data and audio data synchronization method, performed by a video data and audio data synchronization device, the video data and audio data synchronization method comprising:
- receiving video input data from an input interface, and receiving audio input data from the input interface according to a first clock signal;
- storing the audio input data to a storage space in a memory according to a write pointer;
- performing video processing according to the video input data to generate video output data, and storing the video output data to the memory;
- performing audio processing according to the audio input data to generate audio output data, and storing the audio output data to the storage space of the memory;
- reading a plurality of sets of sub-audio data in the audio output data from the storage space according to a read pointer and a second clock signal, and adjusting the second clock signal according to the write pointer, the read pointer and the first clock signal;
- sequentially reading a plurality of sets of frame data in the video output data from the memory; and
- determining, according to a first difference between a video timestamp corresponding to current frame data in the plurality of sets of frame data and an audio timestamp corresponding to current sub-audio data in the plurality of sets of sub-audio data, whether to stop outputting the current frame data.

10. The video data and audio data synchronization method according to claim 9, wherein the adjusting of the second clock signal according to the write pointer, the read pointer and the first clock signal comprises:
- determining a first bias value corresponding to a current timing according to a difference between a second difference and a target value; and
- adjusting a frequency of the second clock signal according to the first bias value and a frequency of the first clock signal,
- wherein the second difference is a difference between the write pointer and the read pointer corresponding to the current timing.

* * * * *